United States Patent
Perlman et al.

(10) Patent No.: US 10,823,223 B2
(45) Date of Patent: Nov. 3, 2020

(54) OVERRIDE FOR AN AUTOMATIC RELEASE VACUUM DEVICE

(71) Applicant: Delaware Capital Formation, Inc., Wilmington, DE (US)

(72) Inventors: Maurice Perlman, Oak Park, MI (US); Kenneth Paul Dellach, Shelby Township, MI (US); Benjamin Jennings, Fenton, MI (US)

(73) Assignee: Delaware Capital Formation, Inc., Wilmington, DE (US)

( * ) Notice: Subject to any disclaimer, the term of this patent is extended or adjusted under 35 U.S.C. 154(b) by 650 days.

(21) Appl. No.: 15/052,047

(22) Filed: Feb. 24, 2016

(65) Prior Publication Data

US 2016/0258472 A1 Sep. 8, 2016

Related U.S. Application Data

(60) Provisional application No. 62/127,495, filed on Mar. 3, 2015.

(51) Int. Cl.
*F16B 47/00* (2006.01)
*F04F 5/28* (2006.01)
*F04F 5/52* (2006.01)
*B66C 1/02* (2006.01)
*B65G 47/91* (2006.01)
(Continued)

(52) U.S. Cl.
CPC ........... *F16B 47/00* (2013.01); *B25J 15/0675* (2013.01); *B65G 47/91* (2013.01); *B66C 1/0256* (2013.01); *B66C 1/0268* (2013.01); *F04F 5/14* (2013.01); *F04F 5/20* (2013.01); *F04F 5/28* (2013.01); *F04F 5/52* (2013.01)

(58) Field of Classification Search
CPC ..... F16B 47/00; F04F 5/52; F04F 5/28; F04F 5/14; F04F 5/20; B66C 1/0268; B66C 1/0256; B25J 15/0675; B65G 47/91
USPC ................................ 417/151, 306, 182, 185
See application file for complete search history.

(56) References Cited

U.S. PATENT DOCUMENTS

| 3,061,179 A | 10/1962 | Pendleton |
| 3,568,959 A | 3/1971 | Blatt |
(Continued)

FOREIGN PATENT DOCUMENTS

| JP | 48-294 | 1/1973 |
| JP | 49-85478 | 7/1974 |
(Continued)

*Primary Examiner* — Essama Omgba
*Assistant Examiner* — Stephen A Mick
(74) *Attorney, Agent, or Firm* — Harness, Dickey & Pierce, P.L.C.

(57) ABSTRACT

A vacuum cup assembly has a vacuum device with a vacuum passageway and a venturi. A vacuum cup is configured to engage an object. The venturi generates an at least partial vacuum at the vacuum cup when the vacuum cup is engaged with an object. The vacuum cup seals against the object when the venturi device generates the at least partial vacuum. A noise reducing device is at a discharge of the venturi. The noise reducing device has a housing defining a chamber, a plurality of spaced exit openings and a movable cap. Air discharged at the venturi is diverted in the chamber and flows out through the exit openings. The movable cap covers the exit opening to override the vacuum to enable the vacuum cup to be positioned or repositioned on the object.

18 Claims, 4 Drawing Sheets

Figure 1:
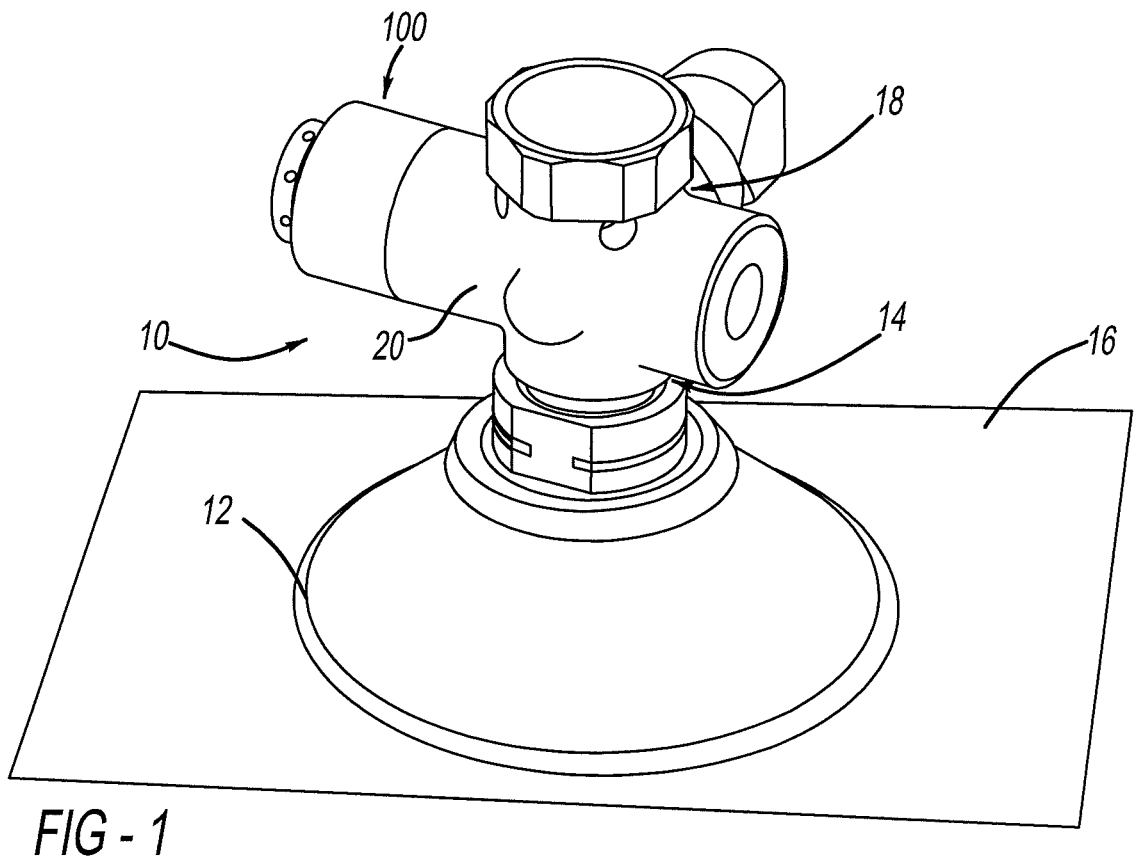

(51) Int. Cl.
   *F04F 5/20*   (2006.01)
   *B25J 15/06*  (2006.01)
   *F04F 5/14*   (2006.01)

(56) References Cited

U.S. PATENT DOCUMENTS

| | | | |
|---|---|---|---|
| 4,073,602 A | 2/1978 | Cagle | |
| 4,453,755 A | 6/1984 | Blatt et al. | |
| 4,549,854 A | 10/1985 | Yamamoto | |
| 4,828,306 A | 5/1989 | Blatt | |
| 4,957,318 A | 9/1990 | Blatt | |
| 5,681,022 A | 10/1997 | Rankin | |
| 5,928,537 A | 7/1999 | Fortune | |
| 6,155,795 A | 12/2000 | Schmalz et al. | |
| 6,213,521 B1 | 4/2001 | Land et al. | |
| 6,213,528 B1 | 4/2001 | Hufken et al. | |
| 7,083,208 B2 | 8/2006 | Ilich | |
| 7,207,609 B2 | 4/2007 | Ilich | |
| 7,404,536 B2 | 7/2008 | Kalb | |
| 8,523,255 B2 | 9/2013 | Fukano et al. | |
| 9,095,983 B2 | 8/2015 | Perlman et al. | |
| 2007/0006940 A1* | 1/2007 | Perlman | B25B 11/007 141/65 |
| 2008/0116338 A1 | 5/2008 | Kalb | |
| 2010/0150743 A1* | 6/2010 | Dellach | B66C 1/0212 417/182 |
| 2015/0336278 A1 | 11/2015 | Perlman et al. | |

FOREIGN PATENT DOCUMENTS

| | | |
|---|---|---|
| JP | 50-45304 | 4/1975 |
| JP | 55-26663 | 2/1980 |
| JP | 07-266274 | 10/1995 |
| RU | 624860 | 9/1978 |

\* cited by examiner

OVERRIDE FOR AN AUTOMATIC RELEASE VACUUM DEVICE

CROSS-REFERENCE TO RELATED APPLICATION

This application claims the benefit of U.S. Provisional Application No. 62/127,495, filed on Mar. 3, 2015. The entire disclosure of the above application is incorporated herein by reference.

FIELD

The present disclosure relates to auto release vacuum devices and, more particularly, to an override for the device.

BACKGROUND

Vacuum cups or the like are utilized to move, through engagement, objects in material handling systems. Such vacuum cups or suction cups may be moved into engagement with the object and a vacuum source may be actuated to create a vacuum between the object and the cups. Applicants' U.S. Pat. No. 7,540,309 issued Jun. 2, 2008; U.S. Pat. No. 7,681,603, issued Mar. 23, 2010; U.S. Pat. No. 7,950,422, issued May 31, 2011, U.S. Pat. No. 8,201,589, issued Jun. 19, 2012 and U.S. Pat. No. 8,479,781, issued Jul. 9, 2013, the specification and drawings of which are expressly incorporated herein by reference, illustrates such a device. These patents provide an automatic release vacuum device or venturi device, such as a vacuum cup assembly for a material handling system that is operable to move one or more vacuum cups into engagement with an object and to pick it up and move the object to a target or desired location. These systems work well for their intended purpose.

However, when repositioning or adjusting the suction cups or vacuum cups on the object, these auto release vacuum devices are tedious for the user to adjust. Accordingly, the present disclosure provides an override that is easily operated by the user. Thus, the present disclosure provides such a device.

According to the present disclosure, a vacuum cup assembly comprises a vacuum device adapted to connect with a pressurized air supply. The vacuum device has a vacuum passageway and a venturi positioned within the vacuum device. A vacuum cup is associated with the device and configured to engage an object. The pressurized air supply is activated to force pressurized air through the venturi to generate at least partial vacuum in the vacuum passageway and at the vacuum cup when the vacuum cup is engaged with an object. Pressurized air flows through the venturi and draws air from the vacuum passageway and into the venturi via at least one vacuum port of the venturi. The vacuum cup is configured to substantially seal against the object when the venturi generates the at least a partial vacuum in the vacuum passageway. A noise reduction device is at a discharge end of the venturi. The noise reduction device includes a housing, a chamber, a plurality of spaced exit openings and a movable cap. Air discharged at the venturi is diverted in the chamber and flows out through the exit openings. The movable cap is movable to cover the exit openings to override the at least partial vacuum in the vacuum passageway to enable the vacuum cup to be positioned, adjusted or repositioned on the object. The movable cap may move on an inner surface of the housing. The movable cap defines a portion of the chamber. A biasing member is within the housing to move the movable cap between its first and second position. Additionally, the movable cap includes the exit apertures.

Additionally, the movable cap moves on an outer circumferential surface of the housing. The movable cap has exit apertures in a first position that align with the exit apertures on the housing. In a second position, the movable cap covers the exit apertures on the housing. A biasing member is formed on the movable cap to return the movable cap to its original position. A latch mechanism on the movable cap secures the movable cap with the housing.

SUMMARY

Accordingly to the present disclosure, a vacuum cup assembly comprises a vacuum device adapted to connect with a pressurized air supply. The vacuum device has a vacuum passageway and a venturi positioned within the vacuum device. A vacuum cup is configured to engage an object. The pressurized air supply is activated to force pressurized air through the venturi to generate at least partial vacuum in the vacuum passageway and at the vacuum cup when the vacuum cup is engaged with an object. Pressurized air flows through the venturi and draws air from the vacuum passageway into the venturi via at least one vacuum port of the venturi nozzle. The vacuum cup is configured to substantially seal against the object when the venturi generates at least a partial vacuum in the vacuum passageway. A noise reduction device is at a discharge of the venturi. The noise reduction device includes a housing, a chamber, a plurality of spaced exit openings and a movable cap. Air discharged at the venturi is diverted in the chamber and flows out through the exit openings. The movable cap is movable to cover the exit openings to override the at least partial vacuum in the vacuum passageway to enable the vacuum cup to be positioned, adjusted or repositioned on the object. The movable cap moves on an inner surface of the housing. The movable cap defines a portion of the chamber. A biasing member is within the housing to move the movable cap between its first and second position. The movable cap includes the exit apertures.

Additionally, the movable cap moves on an outer circumferential surface of the housing. The movable cap has exit apertures in a first position that align with the exit apertures on the housing. In a second position, the movable cap covers the exit apertures on the housing. A biasing member is formed on the movable cap to return the movable cap to a first position. A latch mechanism on the movable cap secures the movable cap with the housing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
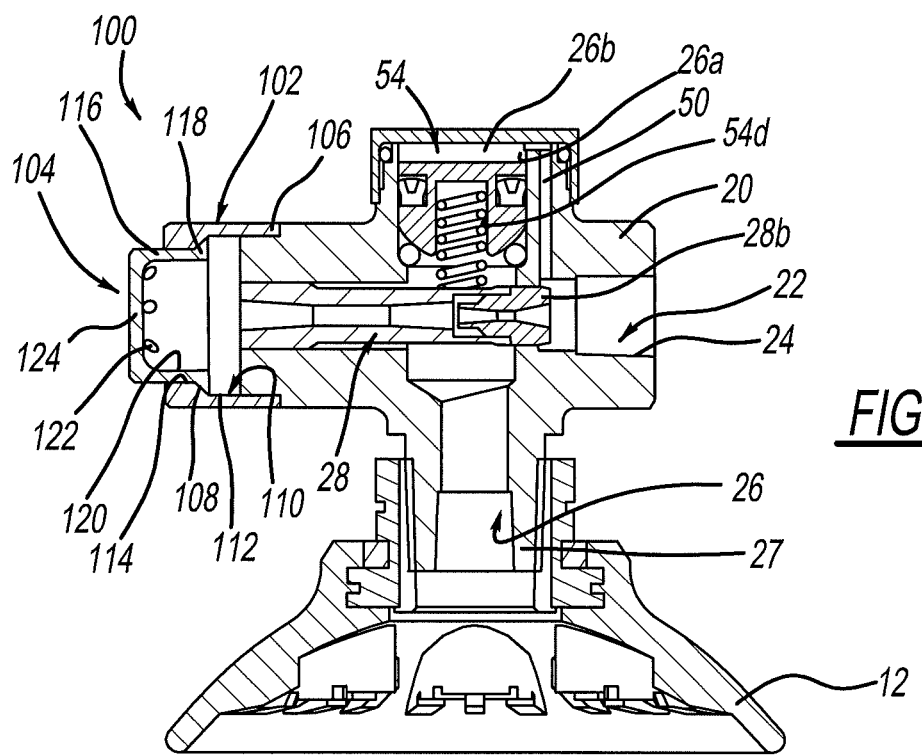
Figure 3:
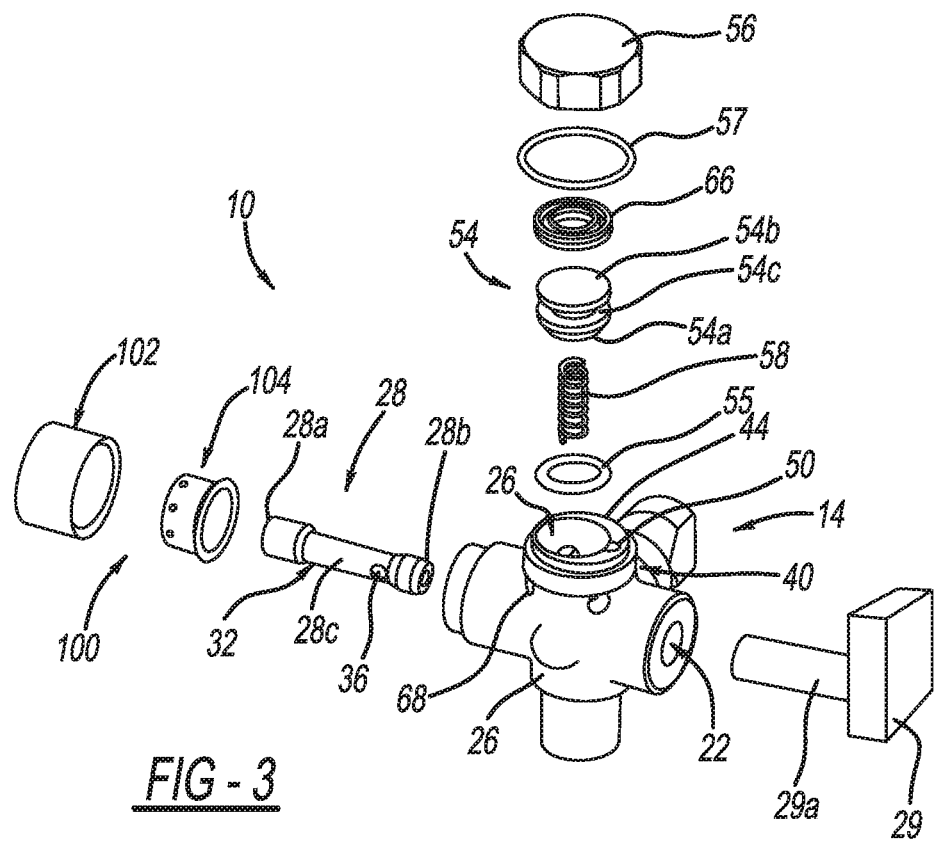
Figure 4:
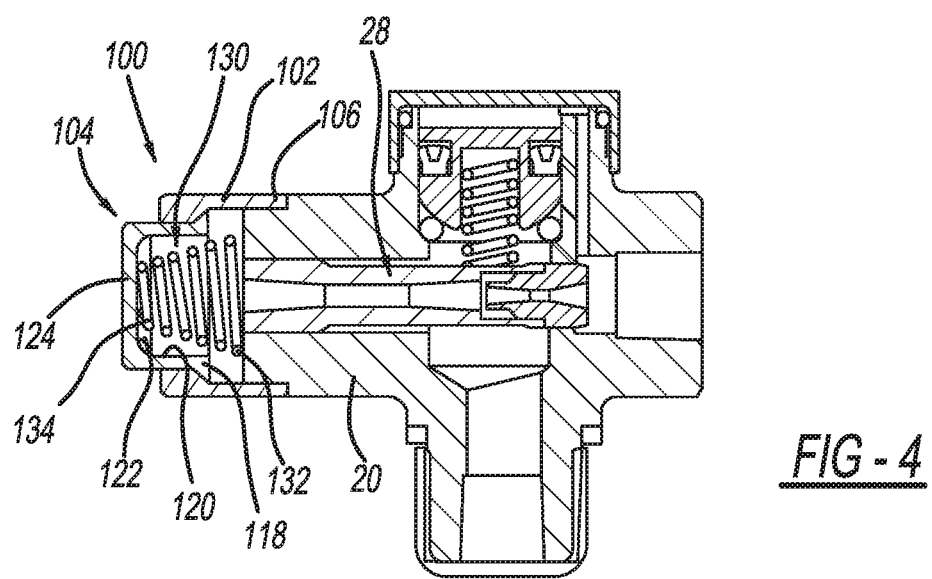
Figure 5:
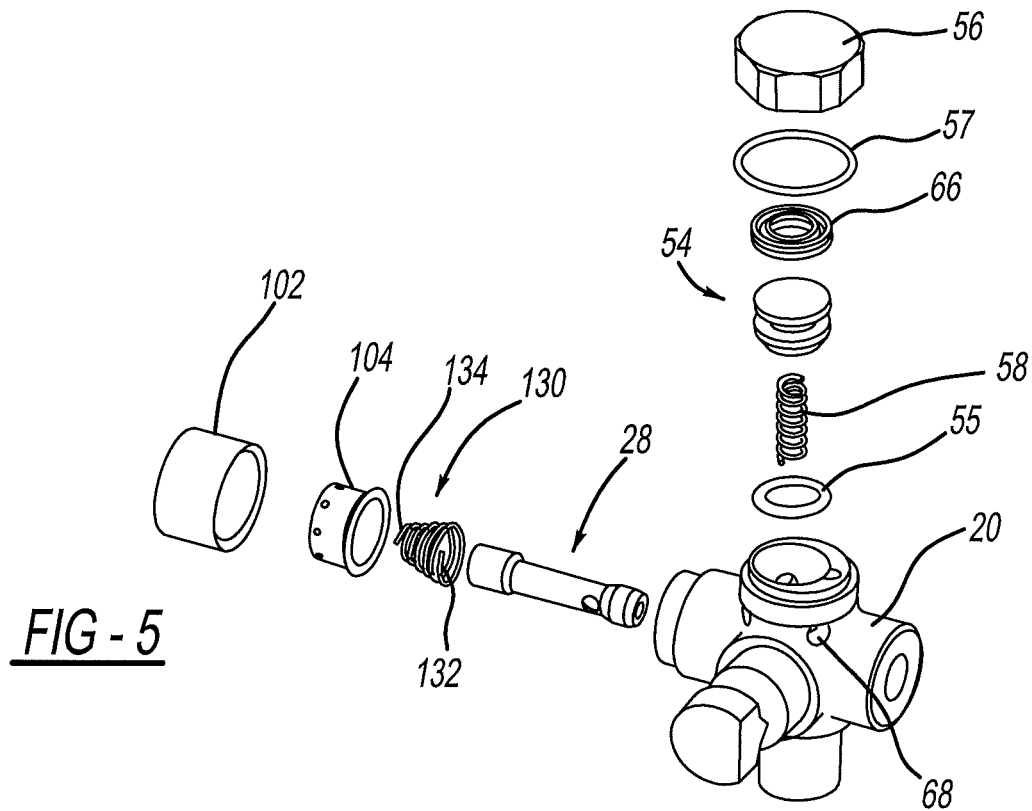
Figure 6:
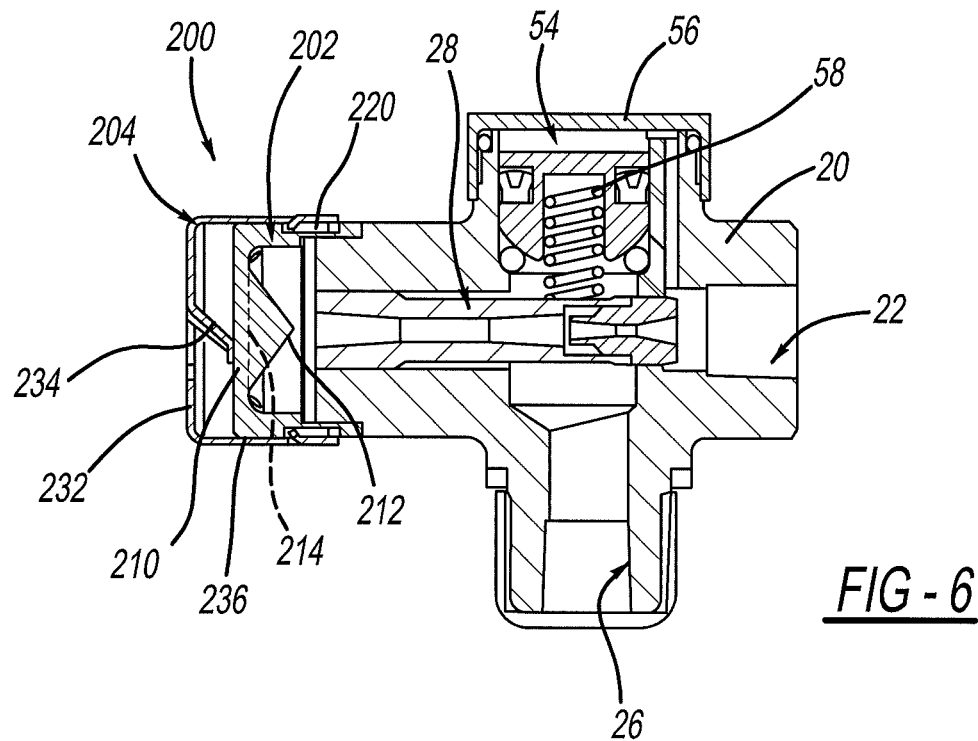
Figure 7:
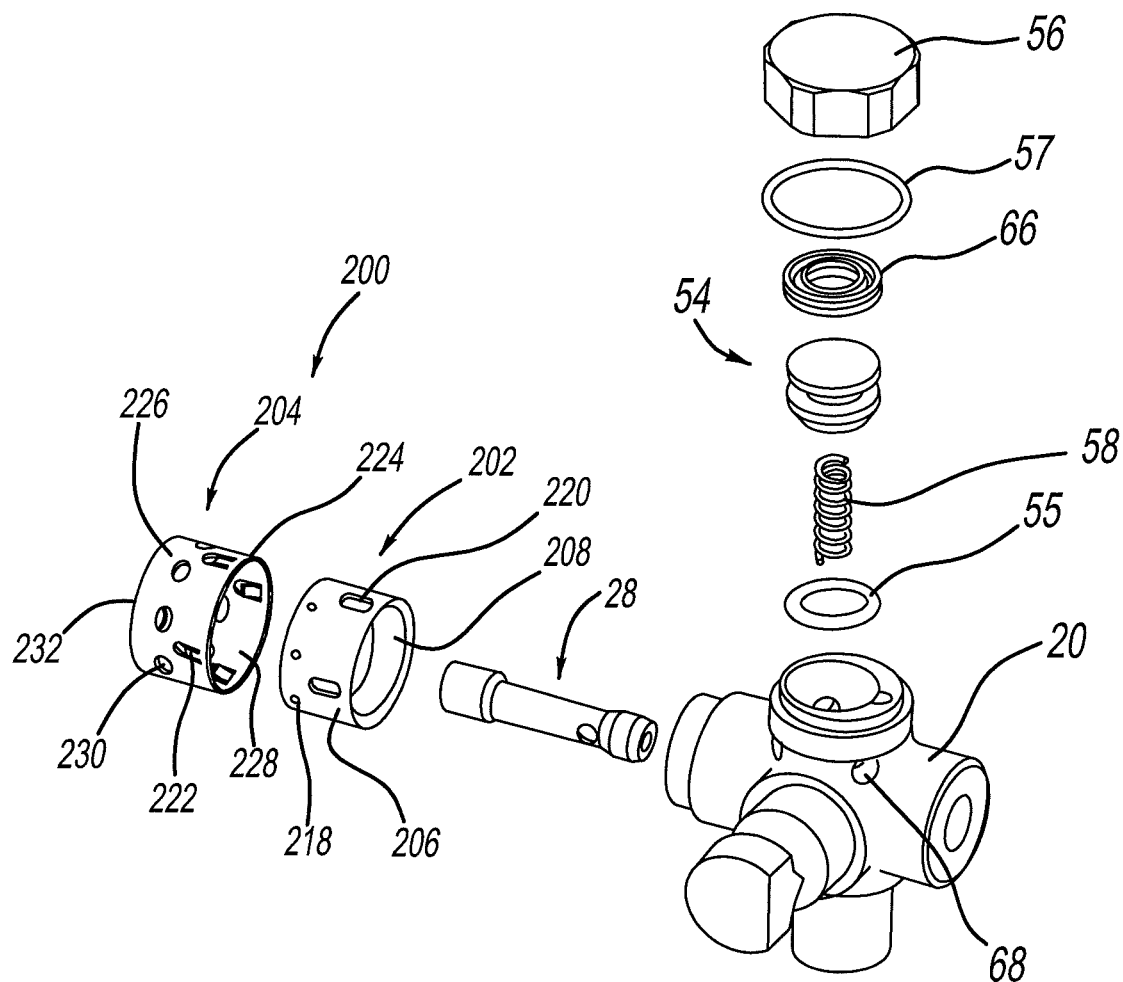

FIG. 1 is a perspective view of the vacuum cup assembly.
FIG. 2 is a cross-sectional view of FIG. 1.
FIG. 3 is an exploded perspective view of FIG. 1.
FIG. 4 is a view like FIG. 2 of a second embodiment.
FIG. 5 is an exploded perspective view of FIG. 4.
FIG. 6 is a view like FIG. 2 of a third embodiment.
FIG. 7 is an exploded perspective view of FIG. 6.

DETAILED DESCRIPTION

Example embodiments will now be described more fully with reference to the accompanying drawings.

Referring now to the drawings and the illustrative embodiments depicted therein, a vacuum cup assembly 10 includes a vacuum cup 12 and an integral automatic release vacuum assembly or venturi assembly or vacuum device 14 operable to create a vacuum or partial vacuum within the vacuum cup 12 when the vacuum cup is engaged with a surface of an object 16 (FIG. 1). The vacuum cup assembly 10 is mountable to a support assembly of a material handling system, which is operable to move the support and vacuum cup assembly (or multiple vacuum cup assemblies or suction cups) into engagement with an object, where the vacuum cup may engage and seal to the object for picking up and moving the object. The material handling system includes a vacuum source or pressurized air supply or pneumatic device for providing or creating a vacuum or partial vacuum at the vacuum cup assembly 10 to substantially vacuum seal the vacuum cup 12 to the object 16. The vacuum device 14 includes a sealing and venting device or assembly or element 18 that is openable to atmosphere in response to deactivation of the vacuum source or air supply or pneumatic device to substantially vent the vacuum from the vacuum cup when the vacuum source or air supply or pneumatic device is deactivated, as discussed below. In the illustrated embodiment, the vacuum source comprises a venturi device or nozzle that is connected to or in fluid communication with a pressurized air supply, such that when the pressurized air supply is activated, pressurized air flows through the venturi device to generate a vacuum in the vacuum device and vacuum cup, as also discussed below.

As shown in FIGS. 1-3, vacuum device 14 includes a vacuum device body or body portion 20 that is preferably unitarily formed and that includes or defines vacuum and venting passageways and ports as described below. For example, the body 20 may be cast or molded or otherwise formed of a metallic material, such as aluminum or the like, or a polymeric material, such as engineering plastic or the like, and may have the passageways bored or drilled through the unitary body to define and connect the appropriate passageways, as discussed below. The vacuum device 14 may be connected to a support arm (not shown) or the like of the material handling device, and may be connected to any type of support arm, without affecting the scope of the present invention. The vacuum cup assembly and material handling system of the present invention may utilize aspects described in U.S. Pat. No. 7,309,089, issued Dec. 18, 2007 entitled VACUUM CUP; and/or U.S. Pat. No. 7,281,739, issued Oct. 17, 2007 entitled ADJUSTABLE MOUNT FOR VACUUM CUP, which are hereby incorporated herein by reference.

As shown in FIG. 2, body 20 includes or defines a vacuum generating passageway 22 therethrough. Vacuum generating passageway 22 defines an outlet or exit port 23 and an inlet or entry port 24 at opposite ends of the passageway 22 and body 20. A vacuum generating device 28 is positioned at or in or partially in vacuum generating passageway 22 and is connectable to a pressure source 29 or air supply tube or pipe 29a (FIG. 3) at inlet port 24. In the illustrated embodiment, vacuum generating device 28 comprises a venturi nozzle that is positioned along passageway 22 with an outlet end 28a at outlet port 23 and an inlet or entry end 28b at or near inlet port 24. A vacuum passageway 26 connects to and is in fluid communication with vacuum generating passageway 22 and vacuum cup 12 at one end and sealing and venting device 18 at the other end, as discussed below. Vacuum passageway 26 terminates at a vacuum cup connection port 27 for connecting body 20 to vacuum cup 12.

Venturi nozzle 28 includes a nozzle body or body portion 32 and a passageway 34 extending longitudinally along the nozzle body 32. The nozzle body 32 includes at least one vacuum port 36 to provide fluid communication through nozzle body 32 to passageway 34. When venturi nozzle 28 is positioned within passageway 22 of body 20, vacuum port or ports 36 is/are positioned generally at and in fluid communication with vacuum passageway 26 of body 20. As is known in the vacuum cup and venturi nozzle art, the passageway 34 of venturi nozzle 28 comprises a narrowing and widening passageway to increase the air flow rate through the venturi nozzle 28 when the air supply or source is activated, whereby air flow through the venturi nozzle 28 draws air through vacuum ports 36 and from vacuum passageway 26 to create a vacuum or partial vacuum in the vacuum passageway 26 when the vacuum passageway is not vented, as discussed below. A silencing element or diffusing element 30 and retaining ring 31 may be positioned at outlet end 28a of nozzle 28.

In the illustrated embodiment of FIGS. 2 and 3, vacuum passageway 26 of body 20 extends upwardly or outwardly from passageway 22 and venturi nozzle 28, with sealing and venting device 18 positioned at an outer end of passageway 26 and at an upper end or outer or venting portion 40 of body 20. Sealing and venting device 18 functions to selectively substantially close and seal vacuum passageway 26 when the air supply is activated and to open or vent vacuum passageway 26 to release or vent the vacuum within the vacuum cup when the vacuum source or air supply is deactivated, as discussed in detail below.

Body 20 of vacuum device 14 also includes or defines a diverting port or passageway 50 that connects and provides fluid communication between the inlet port 24 of the nozzle passageway 22 to an upper or outer surface or end 44a of the wall 44 at venting portion 40 of body 20. The sealing and venting device or assembly 18 functions to selectively connect or provide fluid communication between venting port and vacuum passageway 26 to vent the vacuum cup to atmosphere when the vacuum source or air supply is deactivated, as discussed below.

The sealing and venting device or assembly or element 18 of a vacuum device 14 of a vacuum cup assembly 10 may comprise a first sealing element or movable sealing element 54, such as a piston element, that is movable along a venting passageway or upper or outer passageway portion 26a at or in fluid communication with the vacuum passageway 26 of the body 20 of vacuum device 14 of the vacuum cup assembly 10 to selectively seal and vent the vacuum device and vacuum cup assembly. For example, piston element 54 may engage a second sealing element or portion or seal or ring 55 (such as an elastomeric or rubber sealing ring or the like) positioned at the passageway portion 26a and at or outward from an upper end of the vacuum passageway 26, in order to substantially seal the passageway 26a so that vacuum is generated in the passageway 26 by the venturi device 28. The piston element 54 may move along the passageway portion 26a to engage the sealing ring 55 to substantially seal or close the vacuum passageway when the pressurized air supply is activated to generate the vacuum, and may move away from the sealing ring 55 to vent the vacuum passageway to atmosphere when the pressurized air supply is deactivated or reduced.

The rigid or substantially rigid and movable piston element may provide a robust sealing element and may substantially seal the vacuum passageway when engaged with the sealing ring.

The piston element 54 comprises a generally cylindrically shaped element that is movable along a generally cylindrical-shaped passageway portion 26a at or near vacuum passageway 26 (although other cross sectional shapes may be implemented without affecting the scope of the present invention). A lower or engaging end 54a of piston element 54 may be rounded or curved so as to be partially received in and substantially uniformly engage sealing ring 55 when piston element 54 is urged against the sealing ring 55 when the air supply is activated to generate the vacuum or partial vacuum in the vacuum passageway. More particularly, when the air supply is activated (such as a pressurized air supply or pneumatic device 29 that supplies pressurized air to the vacuum device, such as via an air hose or line 29a), the diverting passageway 50 (formed through the body 20 between an inlet port 24 and an upper or outer end of the venting passageway or passageway portion 26a) diverts some of the pressurized input air to the upper or outer area or cavity 26b (FIG. 5) of passageway portion 26a (between an outer end 54b of piston element 54 and a cap or cover 56 of vacuum cup assembly 10) and thus at the upper or outer end 54b of piston element 54 (and at the opposite side of the piston element from the sealing ring and venting port). The diverted portion of the pressurized input air thus provides a downward pressure against the piston element to assist in urging the piston element toward engagement with sealing ring 55. Thus, when moved to a sealing position, the piston element 54 may substantially seal against the sealing ring 55 to substantially seal and separate or isolate the vacuum passageway from atmosphere. The cap or cover 56 is secured to body 20, and preferably substantially sealed to the body 20, at the outer end of venting passageway 26a, such as via a sealing element 57, such as an O-ring or the like.

Piston element 54 also desirably includes a sliding seal or ring 66 circumferentially around the piston element to seal the piston element within the passageway portion 26a and to enhance sliding or movement of the piston element 54 along the passageway portion. The sliding seal 66 is received in a groove 54c formed circumferentially around piston element 54 and between the curved sealing surface 54a and the outer end 54b of piston element 54. Sliding seal 66 limits air leakage past piston element 54 within passageway 26a, while allowing substantially unrestricted and smooth movement of piston element within the passageway.

Vacuum cup assembly 10 includes a biasing element or urging element or spring 58 that functions to bias or urge piston element 54 outward and away from sealing ring 55 and toward a venting position. In the illustrated embodiment, biasing element or spring 58 is partially received within a passageway or recess 54d formed longitudinally partially along piston element 54 and protrudes therefrom to engage the venturi nozzle body 28c or to engage a stop element or plate portion (not shown) at or near the lower or inner end of the passageway portion 26a and/or upper or outer end of the vacuum passageway 26. The biasing force of the biasing element or spring 58 of vacuum cup assembly 10 may be overcome (and the spring or biasing element thus may be compressed) by the force exerted by the diverted portion of the pressurized inlet air at the upper or outer end 54b of piston element 54, and/or by the force exerted by the vacuum or partial vacuum generated within the vacuum passageway.

When the pressure source or pressurized air supply is reduced or deactivated (and the diverted air is reduced or eliminated so that it no longer exerts sufficient pressure or force at the outer end 54b of piston element 54 to overcome the spring force or biasing force), the biasing force may overcome the vacuum pressure within the vacuum passageway and may move the piston element outward to disengage the piston element from the sealing ring. When the piston element is moved away from the sealing ring so that the curved engaging surface 54a is remote or spaced from sealing ring 55, the vacuum passageway is vented (and thus the vacuum or partial vacuum within the vacuum passageway and vacuum cup is vented and thus dissipated).

The body 20 may include passageways or channels or apertures or ports 68 that provide fluid communication or air flow between passageway 26a and the air or atmosphere surrounding the vacuum cup assembly. The passageways 68 are located above or outward from the sealing ring 55, and at the opposite side of sealing ring from the venturi device, such that air does not flow through the passageways 68 to vent the vacuum passageway 26a when piston element 54 is substantially sealed against sealing ring 55. Thus, when the piston element 54 is moved away from or disengaged from sealing ring 55, the vacuum passageway is readily vented to atmosphere, such as via air flow through and along channels or grooves or passageways 68 formed or established along the piston passageway portion 26a and outside of or above the sealing ring 55. The piston element 54 and sealing ring 55 thus function to substantially seal the vacuum passageway when the air supply is activated so that the venturi device may generate a vacuum or partial vacuum within the vacuum passageway (when the vacuum cup is engaged with an object), and the piston element may move away from the sealing ring to vent the vacuum passageway when the air supply is deactivated or reduced (to assist in releasing the vacuum cup from the object).

Although shown and described as having a movable sealing element, such as a piston element or a diaphragm element, that engages a second sealing element, such as a sealing ring or a venting port, that is located remote from the venturi nozzle along the vacuum and venting passageways, it is envisioned that the movable sealing element may be located elsewhere in or at the vacuum device or body where the sealing device selective seals and vents the vacuum passageway in response to the pressurized air supply being activated and deactivated. For example, the movable sealing element may be movably or flexibly located at or generally around the vacuum port 36 of the venturi device 28. The second sealing device thus may comprise the venturi nozzle body itself and/or the portion of the body at or adjacent to the venturi nozzle body, and the movable sealing element may seal against the venturi device and/or body portion to seal the venting passageway when the pressurized air supply is activated, and may disengage from the venturi device to vent the vacuum passageway when the pressurized air supply is deactivated. Optionally, the movable sealing element, such as a piston element, may include a flexible or compressible or conformable seal (such as an elastomeric or rubber seal) at an engaging surface, and the piston element may move to engage the flexible seal with a sealing surface along the passageway, such as at an end of the vacuum passageway or at the venturi nozzle or elsewhere within the vacuum device, without affecting the scope of the present invention. Other configurations of a movable sealing element and the diverted air supply and biasing element (preferably all of which are within or integral with the body of the vacuum device) may be implemented while remaining within the spirit and scope of the present invention.

The movable sealing element thus functions to selectively seal and vent the vacuum passageway of the body. The venting port or ports may be located anywhere along the venting passageway so as to be exposed or in fluid communication with the vacuum passageway when the sealing element is in the venting position. It is envisioned that, if the movable sealing element is not substantially sealed against the walls of the venting passageway as it moves therealong (such as if a movable piston element includes longitudinal passageways along its outer circumferential region), the venting port may be located further along the venting passageway, and may be located at the cap or cover, without affecting the scope of the present invention. Thus, the venting port or ports may be located at various locations, as long as the venting passageway and venting ports are selectively sealed or isolated from the vacuum passageway by the sealing element when the sealing element is moved to the sealing position, and are selectively opened or in fluid communication with the vacuum passageway when the sealing element is moved to the venting position.

The vacuum cup assembly includes a venturi silencing device or noise reducing device 100 with an integral override. The integral override enables the vacuum generator 28 to be blocked and forces the air pressure out of the cup 12 breaking the vacuum hold on the panel. This enables the cup 12 to be easily repositioned during setup or adjustment of the end effector.

The silencer 100 includes a casing or housing 102 with a removable cap 104. The housing 102 is cylindrical and has one end 106 secured with the vacuum body 20. The other end includes an interior shoulder 108 that retains the movable cap 104 in the interior of the housing 102. The housing 102 includes a bore 110 that is divided by the shoulder 108 into a first section 112 and a second section 114.

The movable cap 104 has a cylindrical body 116 with an outer circumferential surface fitting into the second bore portion 114. A flange 118 mates with the shoulder 108 to retain the movable cap 104 within the housing 102. The movable cap 104 is hollow and has an internal bore 120. A plurality of exit apertures 122 are positioned circumferentially about the body 116 of the movable cap 104. The exit apertures 122 enable the air to exit the silencer 100. The movable cap 104 also includes an end portion 124 that terminates the bore 120.

In order to manually override the vacuum, the movable cap 104 is pushed towards the venturi 28. As this occurs, the exit apertures 122 become blocked by the housing second bore portion 114 at the bore 110. As this occurs, air traveling through the venturi 28 is forced through the vacuum cup 12. This enables the vacuum cup 12 to be positioned or adjusted on the workpiece. Thus, a user can utilize a finger on the movable cap 104 of the silencer 100 in order to interrupt the vacuum enabling positioning of the cup 12.

Turning to FIGS. 4 and 5, a second embodiment of the silencer 100 is shown. The silencer 100 is the same as that illustrated above and thus the same reference numerals are utilized. However, here, a biasing member 130 is positioned between the end 124 of the cap 104 and the body 20. The biasing member 130 is preferably a helical spring with a cone shape. The cone shape enables a larger coil 132 at the venturi 28 and a smaller coil 134 at the cap end 124. This prohibits the biasing member 130 from interfering with the air stream exiting the venturi 28. Thus, air exiting the venturi 28 may exit the exit apertures 122 of the movable cap 104 with the least amount of resistance. Additionally, the biasing member 130 assists in returning the movable cap to its original position enabling air to pass through the exit apertures 122.

Turning to FIGS. 6 and 7, another embodiment of the vacuum generator silence 200 is illustrated with an integral override.

The vacuum generator silencer 200 includes a housing 202 with a movable cap 204. The movable cap 204 slides on the exterior circumferential surface 206 of the housing 202. The housing 202 has a cylindrical shape with the outer circumferential surface 206, an inner bore 208 and a bottom 210. The bottom 210 may include a conical projection 212 as shown. Alternatively, the projection 212 may be eliminated as illustrated in phantom at 214. The housing 202 has a circumferential wall 216 that includes circumferentially spaced exit apertures 218. Additionally, the wall 216 includes spaced slots 220. The housing 202 is positioned onto the body 20. Air exiting the venturi 28 is guided by the conical surface 212 out the exit apertures 218. The slots 220 retain the movable cap 204 on the housing 202. The slots 220 are cut into the outer circumferential surface 206 and do not extend through to the inner bore 208, as best seen in FIG. 6.

The movable cap 204 has a cylindrical configuration. The movable cap 204 has a plurality of latches or detent fingers 222 that correspond in number to the slots 220. The latches or detent fingers 222 fit into the slots 220. The latch or detent fingers 222 maintain the movable cap 204 on the housing 202. Also, the latches or detent fingers 222 enable the movable cap 204 to slide on the outer circumferential surface 206 of the housing 202. The cap 204 has a cylindrical body 224 with an outer surface 226 and an inner bore 228. A plurality of apertures 230 extend through the body 224 from the outer surface 226 of the movable cap into the bore 228. The slots 230 correspond in number to the exit apertures 218. Additionally, the slots 230 align with the apertures 218 when the movable cap is in a resting position as seen in FIG. 6. This enables the air to exit through the exit apertures 218 as well as slots 230 from the venturi 28.

The bottom 232 of the movable cap 204 includes a biasing member 234. The biasing member 234 biases against the bottom surface 210 of the housing 202. The biasing member 234 is a spring finger positioned on the bottom surface 210. The biasing member 234 is generally stamped out of the movable cap 204. Thus, the movable cap is generally formed from spring steel or the like.

In operation, the venturi 28 exits air through the exit apertures 218 and then through the slots 230. When the vacuum cup needs to be repositioned or removed from the workpiece, the removable cap 204 is pushed, by the user's finger, along the outer circumferential surface 206 of the housing 202 towards the venturi 28. As this occurs, the biasing member 234 deflects coming aligned with the bottom surface 232 of the movable cap 204. Also, as this occurs, the slots 230 move out of alignment with the exit apertures 218. Thus, circumferential wall 236 of the movable cap 204 covers or plugs the exit apertures 218. This interrupts the vacuum in the device forcing the air to be exited through the vacuum cup 12. Thus, the vacuum cup 12 is removable from the workpiece enabling it to be positioned or repositioned onto the workpiece. After the force is removed from the end 232 of the movable cap 204, the biasing member 234 biases the movable cap 204 back to its resting position.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vacuum cup assembly comprising:
   a vacuum device adapted to connect to a pressurized air supply, said vacuum device having a vacuum passageway and a venturi positioned within said vacuum device;
   a vacuum cup configured to engage an object;
   said pressurized air supply being activatable to force pressurized air through said venturi to generate an at least partial vacuum in the vacuum passageway and at the vacuum cup when the vacuum cup is engaged with an object, the pressurized air flowing through the venturi and drawing air from the vacuum passageway and into the venturi via at least one vacuum port of the venturi;
   the vacuum cup is configured to substantially seal against the object when the venturi generates at least a partial vacuum in the vacuum passageway;
   a noise reducing device at a discharge of the venturi nozzle, the noise reducing device comprising a housing defining a chamber, a plurality of spaced exit openings positioned about the housing and a movable cap, air discharged at the venturi is diverted in the chamber and flows out through the plurality of spaced exit openings; and
   the movable cap is movable to cover the plurality of spaced exit openings to override the vacuum, enabling the vacuum cup to be positioned or repositioned on the object.

2. The vacuum cup of claim 1, wherein the movable cap moves on an inner surface of the housing.

3. The vacuum cup of claim 2, wherein the movable cap defines a portion of the chamber.

4. The vacuum cup of claim 2, further comprising a biasing member in the housing moving the movable cap to a first position.

5. The vacuum cup of claim 2, wherein the movable cap includes exit apertures.

6. The vacuum cup of claim 1, wherein the movable cap moves on an exterior surface of the housing.

7. The vacuum cup of claim 6, wherein the movable cap includes a plurality of exit apertures, in a first position, the plurality of exit aperture are aligned with the plurality of spaced exit openings on the housing and in a second position, the movable cap covers the plurality of spaced exit openings on the housing.

8. The vacuum cup of claim 6, further comprising a biasing member on the movable cap to return the movable cap to its first position.

9. The vacuum cup of claim 6, further comprising a latch mechanism for securing with the housing for retaining the movable cap on the housing.

10. A vacuum assembly comprising:
    a vacuum device adapted to connect to a pressurized air supply, said vacuum device having a vacuum passageway and a venturi positioned within said vacuum device;
    said pressurized air supply being activatable to force pressurized air through said venturi to generate an at least partial vacuum in the vacuum passageway, the pressurized air flowing through the venturi and drawing air from the vacuum passageway and into the venturi via at least one vacuum port of the venturi;
    a diffuser device at a discharge of the venturi nozzle, the diffuser device comprising a housing defining a chamber, a plurality of spaced exit openings positioned about the housing and a movable cap, air discharged at the venturi is diverted in the chamber and flows out through the plurality of spaced exit openings; and
    the movable cap is movable to cover the plurality of spaced exit openings to override the vacuum wherein a vacuum cup is enabled to be positioned or repositioned on an object.

11. The vacuum assembly of claim 10, wherein the movable cap moves on an inner surface of the housing.

12. The vacuum assembly of claim 11, wherein the movable cap defines a portion of the chamber.

13. The vacuum assembly of claim 11, further comprising a biasing member in the housing moving the movable cap to a first position.

14. The vacuum assembly of claim 11, wherein the movable cap includes exit apertures.

15. The vacuum assembly of claim 10, wherein the movable cap moves on an exterior surface of the housing.

16. The vacuum assembly of claim 15, further comprising a biasing member on the movable cap to return the movable cap to its first position.

17. The vacuum assembly of claim 15, further comprising a latch mechanism for securing with the housing for retaining the movable cap on the housing.

18. A vacuum assembly comprising:
    a vacuum device adapted to connect to a pressurized air supply, said vacuum device having a vacuum passageway and a venturi positioned within said vacuum device;
    said pressurized air supply being activatable to force pressurized air through said venturi to generate an at least partial vacuum in the vacuum passageway, the pressurized air flowing through the venturi and drawing air from the vacuum passageway and into the venturi via at least one vacuum port of the venturi;
    a diffuser device at a discharge of the venturi nozzle, the diffuser device comprising a housing defining a chamber, a plurality of spaced exit openings positioned about the housing and a movable cap, air discharged at the venturi is diverted in the chamber and flows out through the plurality of spaced exit openings; and
    the movable cap is movable to cover the plurality of spaced exit openings to override the vacuum wherein a vacuum cup is enabled to be positioned or repositioned on an object;
    the movable cap includes a plurality of exit apertures, in a first position, the plurality of exit aperture are aligned with the plurality of spaced exit openings on the housing and in a second position, the movable cap covers the plurality of spaced exit openings on the housing.

* * * * *